May 5, 1925.

W. J. HACKETT 1,536,178

ASPHALT PAVEMENT CUTTING MACHINE

Filed Oct. 20, 1920

5 Sheets-Sheet 1

Inventor
WILLIAM J. HACKETT
by
Attorney

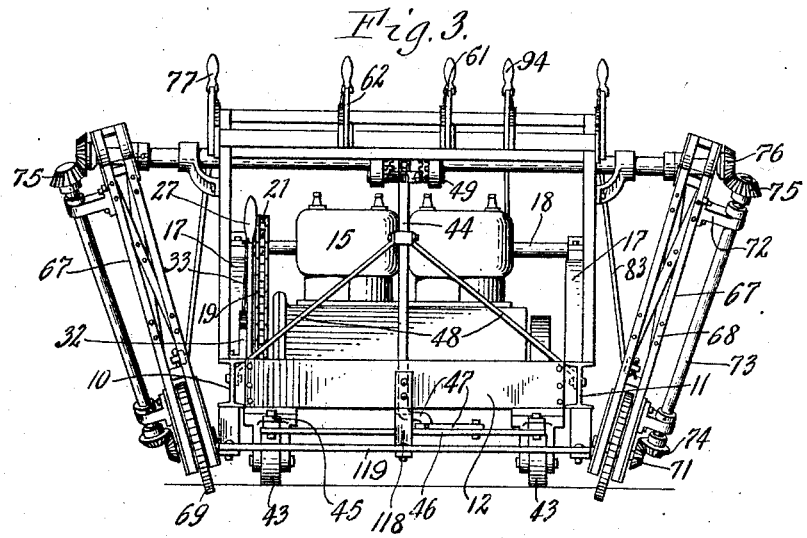
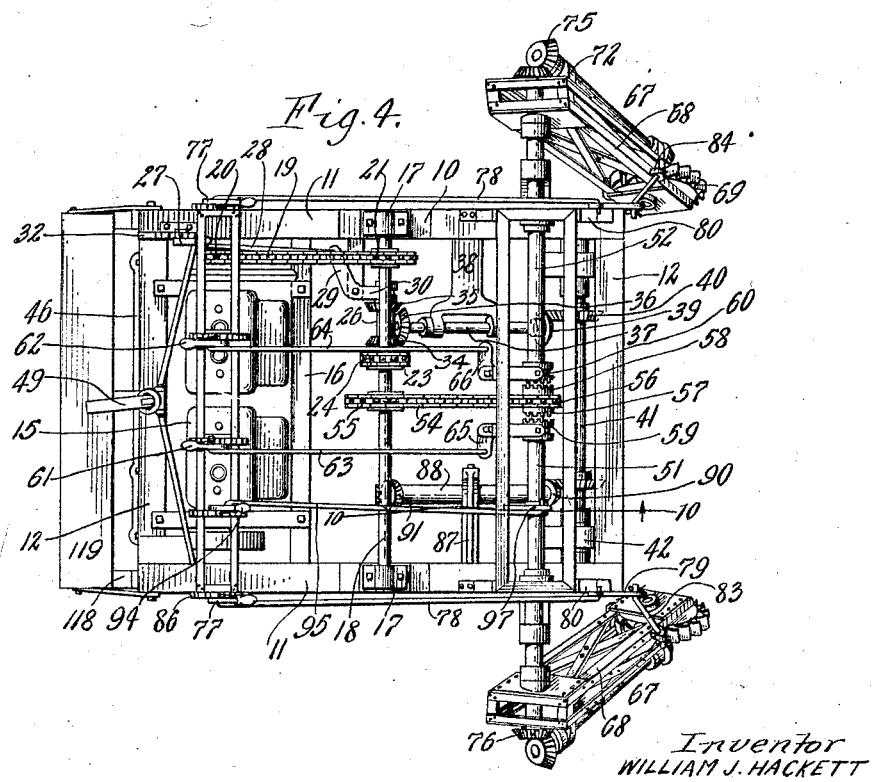

May 5, 1925.  
W. J. HACKETT  
ASPHALT PAVEMENT CUTTING MACHINE  
Filed Oct. 20, 1920    5 Sheets-Sheet 3

1,536,178

Inventor  
WILLIAM J. HACKETT  
by Clarence S. Walker  
Attorney

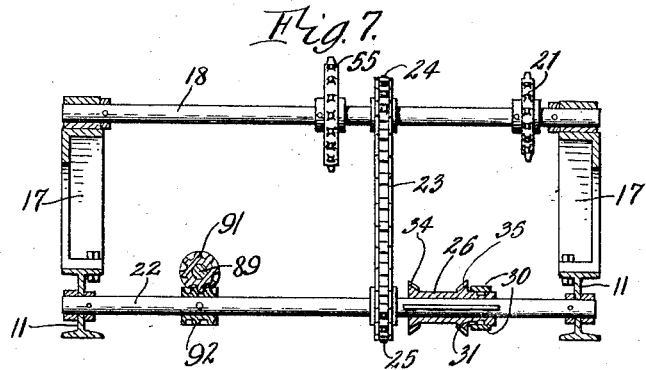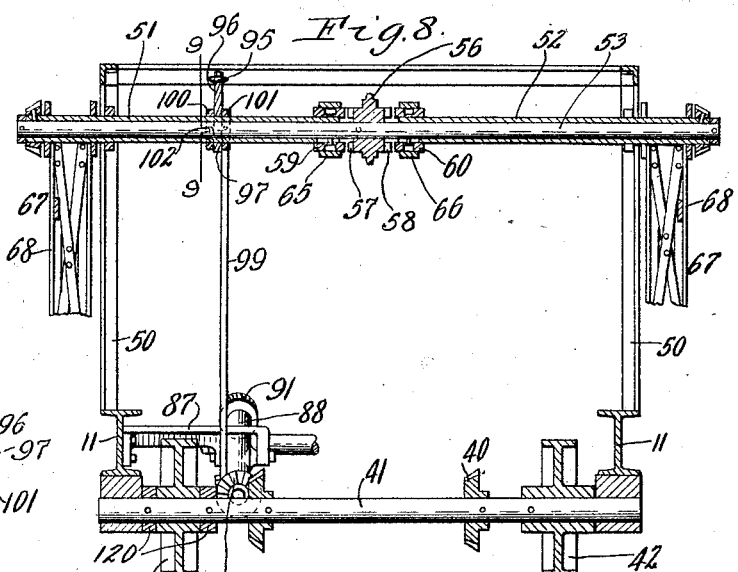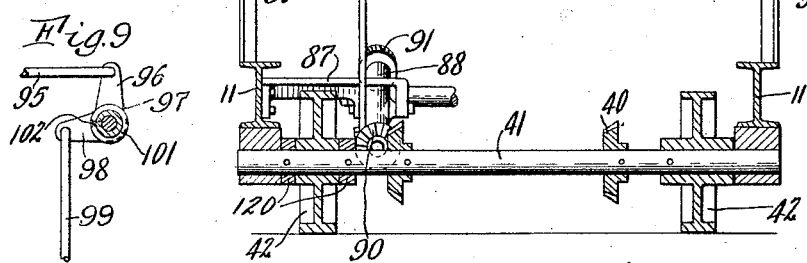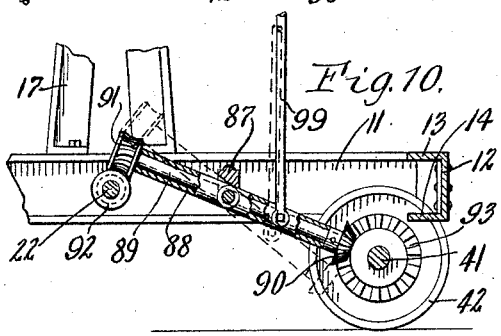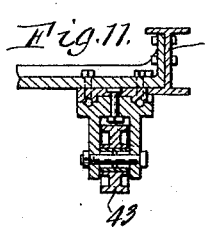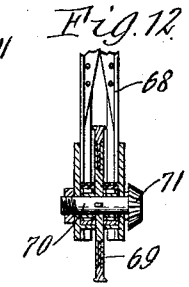

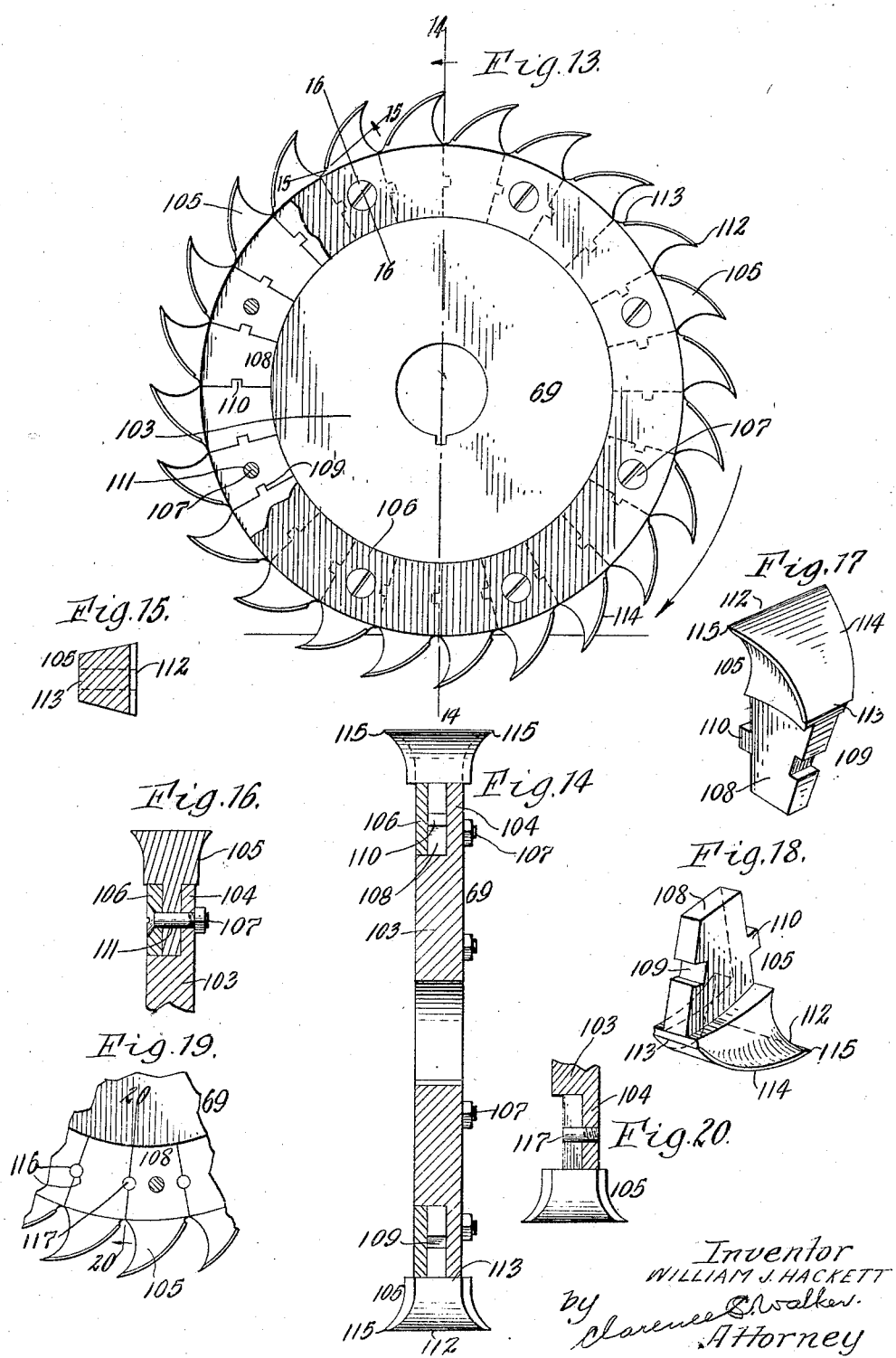

Patented May 5, 1925.

1,536,178

UNITED STATES PATENT OFFICE.

WILLIAM J. HACKETT, OF JAMESTOWN, NEW YORK.

ASPHALT-PAVEMENT-CUTTING MACHINE.

Application filed October 20, 1920. Serial No. 418,169.

*To all whom it may concern:*

Be it known that I, WILLIAM J. HACKETT, a citizen of the United States, and resident of Jamestown, county of Chautauqua, State of New York, have invented certain new and useful Improvements in Asphalt-Pavement-Cutting Machines, of which the following is a specification.

This invention relates to an improvement in cutting machines and particularly in such machines equipped with circular cutting saws.

One object of this invention is to produce a cutting machine in which the cutting operation is performed by one or more circular saws acting upon the surface on which the machine is supported.

Another object of this invention is to produce a cutting machine having circular cutting saws mounted obliquely to the machine and to the surface operated upon.

Another object is to produce a cutting machine in which the cutting mechanism and the propelling mechanism operate in fixed relation to each other.

A further object is to produce a circular saw having interlocking and independently removable blades.

Figure 1:
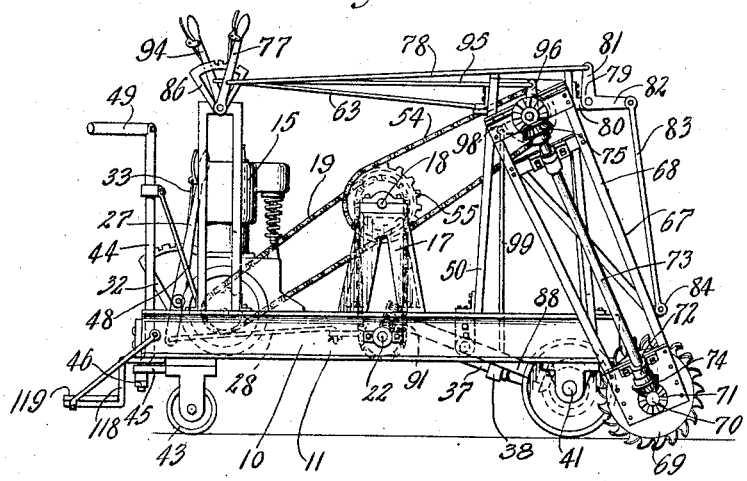
Figure 2:
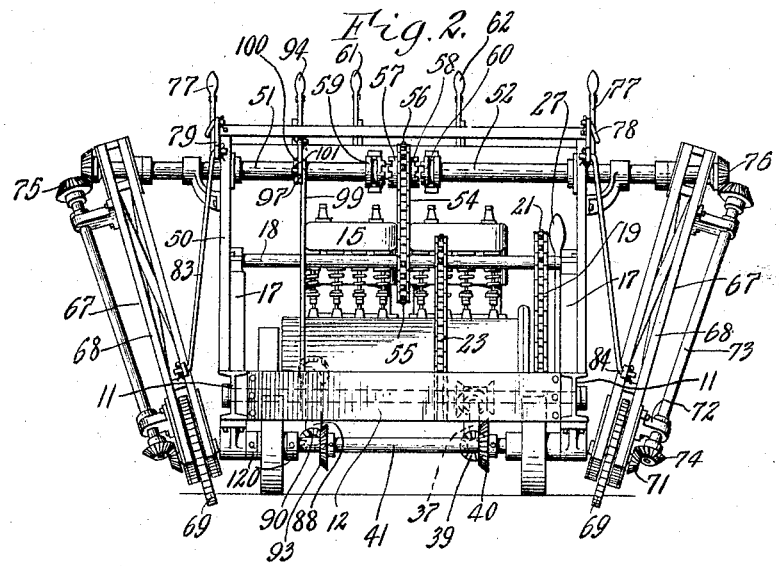
Figure 5:
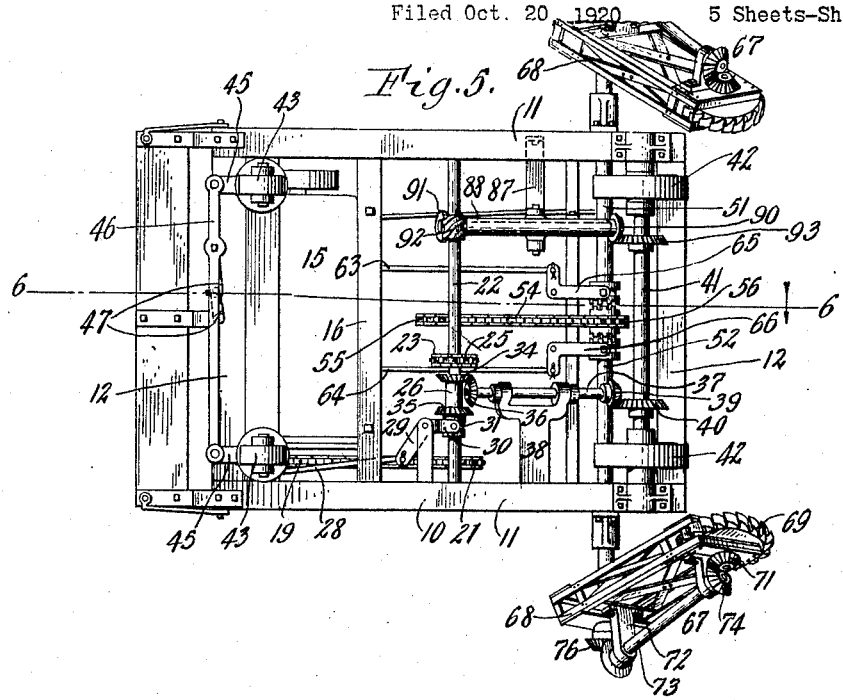
Figure 6:
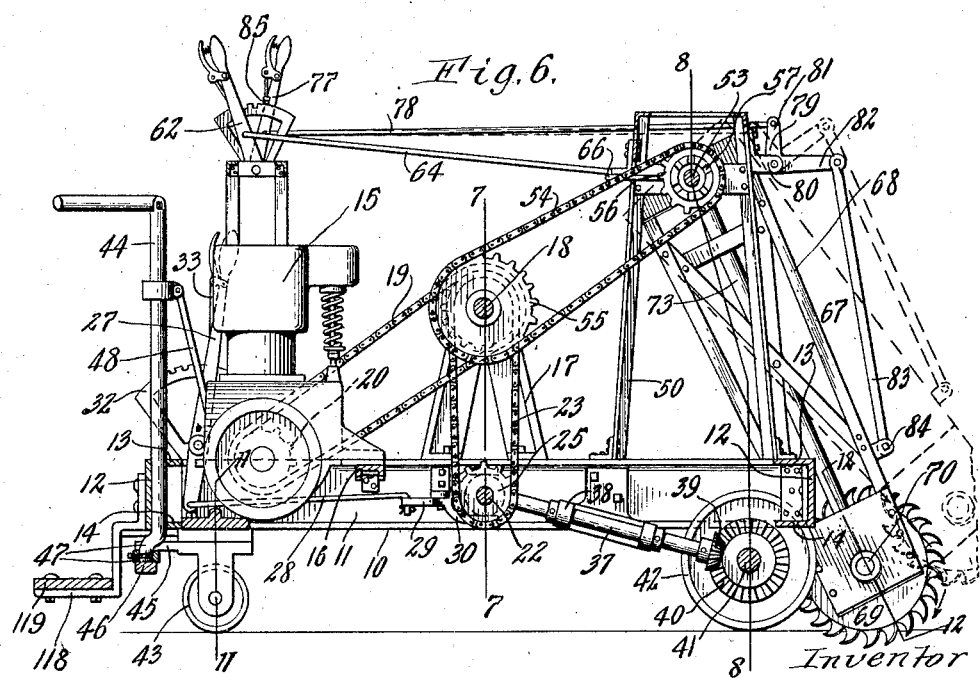

Other objects will appear from an examination of the specification and the drawings which form a part thereof and in which;

Fig. 1 is a side elevation of one embodiment of this invention;
Fig. 2 is a front elevation;
Fig. 3 is a rear elevation;
Fig. 4 is a top plan view;
Fig. 5 is a bottom plan view;
Fig. 6 is a longitudinal section taken on the line 6—6 in Fig. 5;
Fig. 7 is a sectional view on the line 7—7 in Fig. 6 showing part of the gear connections;
Fig. 8 is a section taken on the line 8—8 in Fig. 6;
Figs. 9, 11, and 12 are details of the machine;
Fig. 10 is a section taken on the line 10—10 in Fig. 4;
Fig. 13 is a side elevation of the circular saw;
Fig. 14 is a cross section of the saw taken on the line 14—14 in Fig. 13;
Figs. 15 and 16 are sectional views of the saw blades taken on the lines 15 and 16 in Fig. 13;
Figs. 17 and 18 are views of the saw blade at different points; and
Fig. 19 is a side elevation of a modification of the blade mounting.
Fig. 20 is a section taken on the line 20—20 in Fig. 19.

Referring to the drawings the reference numeral 10 designates the frame of the machine, here shown composed of angle bars bolted or otherwise fastened together in rectangular form, the side bars 11 being I-beams and the cross bars 12 being channel beams with the upper and lower flanges 13 and 14 projecting inwardly. On the rear end of the frame is a prime mover 15, supported upon the rear cross bar 12 and an intermediate cross bar 16. The prime mover shown is a gasoline motor but obviously other means could be substituted therefor if desired.

Carried on supports 17 mounted on the side bars 11 is a cross shaft 18 driven from the prime mover 15 by a chain 19 connecting the sprocket 20 on the prime mover with the sprocket 21 keyed to the shaft. From the shaft 18 power is distributed to the various moving parts of the machine by gearing to be described later in detail so that the shaft 18 will hereafter be referred to as the distributer shaft.

Parallel to and below the distributer shaft is a cross shaft 22 mounted in the side bars 11 by which the traction wheels are driven and hence referred to hereafter as the traction shaft. The traction shaft 22 which is driven from the distributer shaft 18 by the chain 23 running over the sprockets 24 and 25 has splined thereon a double gear collar 26 which is moved axially thereon by means of the shifting lever 27 through the link 28 and the pivoted plate 29 having arms 30 resting in the groove 31 of the collar 26. A suitable segment 32 and locking bar 33 are provided to hold the lever 27 in the desired position.

The collar 26 carries two faced bevel gears 34 and 35 between which is positioned a bevel gear 36 with which either gear 34 or 35 can be thrown into engagement by the lever 27. Furthermore the collar may also be brought into an intermediate position so that neither gear 34 nor 35 will engage the gear 36. In order to determine quickly and accurately the desired position of the collar three notches are provided in the segment 32. When the lever is fixed by the forward notch the gear 34 engages the gear 36 (see Fig. 6), when fixed by the rear notch the gear 35 engages the gear 36, and when fixed by the intermediate notch both gears 34 and 35 are idle.

The gear 36 is carried by a longitudinal shaft 37 supported by a bracket 38 mounted on the side bar 11 and having at its other end a bevel gear 39 which engages a bevel gear 40 mounted on the live front axle 41 of the machine. The axle 41 is supported by the side bars 11 and on it are fixed the front driving wheels 42. It will be noted that the gears 34 and 36 drive the machine forward while the gears 35 and 36 drive it backward.

The rear wheels 43 by which the machine is steered are separately and rotatably mounted in the manner shown and described in my co-pending application Serial No. 404,978 filed August 21, 1920 and are controlled by the steering bar 44 through the arms 45, the connecting links 46, and the intermediate plates 47. Suitable braces 48 are provided to support the bar which has a pivoted handle 49.

On the front of the side bars 11 are mounted supports 50 for the cutter mechanism. Suitably carried by the supports 50 are hollow shafts 51 and 52 mounted to rotate and in which turns a hollow shaft 53. The shaft 53 is driven from the distributer shaft 18 by a chain 54 running over sprocket 55 on the shaft 18 and sprocket 56 on the shaft 53. At each side of the sprocket 56 which is pinned or otherwise fastened to the shaft 53 are fixed or integral therewith clutch collars 57 and 58 with which clutch collars 59 and 60 keyed on the hollow shafts 51 and 52 are adapted to engage. The clutch collars 59 and 60 are shifted into and out of mesh with the collars 57 and 58 by levers 61 and 62 through links 63 and 64 and pivoted plates 65 and 66 respectively. Segments and locking bars similar to the segment 32 and bar 33 are provided to determine the positions of the levers.

By the construction described below the hollow shafts 51 and 52 operate the circular cutting saw mechanisms 67. Since these mechanisms are identical one only will be described in detail but the same reference numerals will be applied to corresponding parts of both.

The cutter mechanism 67 comprises a frame 68 carrying at the bottom a circular saw 69 fixed on a cross shaft 70 at the outer end of which is a bevel gear 71. Mounted in brackets 72 at the side of the frame is a longitudinal shaft 73 having at one end a bevel gear 74 in engagement with the gear 71 and at the other end a gear 75 which meshes with a gear 76 at the end of the hollow shaft. The saw is thus operated when the hollow shaft is set in motion, by the gears 76, 75, shaft 73, gears 74, 71, and shaft 70.

The cutting mechanism is mounted to engage the surface to be operated upon at an angle and is pivoted on the hollow shaft so that the cutter can be raised out of engagement with the surface as shown by the dotted lines in Fig. 6. Further it is desired to regulate the depths of the cuts by raising or lowering the mechanism. This is done by a lever 77 connected by a link 78 with an angle plate 79 pivoted on a bracket 80 of the support 50. To one arm 81 of the plate 79 is fastened the link 78 while the other arm 82 is connected by a link 83 to a bracket 84 on the frame 68 near the saw. The lever 77 has a locking bar 85 which engages with notches in the segment 86 to hold the lever in the desired position. A plurality of notches are provided in the segment at such distances apart that when the lever is shifted from one notch to the adjoining notch the cutting depth is increased or decreased a fixed amount.

Pivoted on a bracket 87 fixed to a side bar 11 opposite the bracket 38 is a sleeve 88 in which turns a shaft 89 having at one end a bevel gear 90 and at the other end a worm gear 91. On the traction shaft 22 is mounted a worm 92 and on the shaft 41 a bevel gear 93 which are positioned to mesh respectively with the worm gear 91 and the bevel gear 90. The sleeve 88 is oscillated on the bracket 87 by a lever 94 connected by a link 95 with an arm 96 of a pivoted plate 97 the other arm 98 of which is connected by a link 99 with the sleeve 88 in advance of the bracket 87. The plate 97 turns on the hollow shaft 51 and is positioned by collars 100 and 101 each fastened by pins 102 to the shaft as shown in Fig. 9.

When the sleeve is turned on its pivot by the lever 94 the bevel gear 90 meshes with the bevel gear 93 and the worm gear 91 meshes with the worm 92. Thus through the traction shaft 22 which rotates continuously the axle 41 and the wheels 42 are set in motion. It will, of course, be understood that when the location for the cutters to operate is reached the sleeve 26 will be shifted into idle position out of engagement with the gear 36. The ratio of the worm 92 and the worm gear 91 is such that the machine is moved forward slowly as the saws revolve thus feeding them to the work. It has been determined that the most satisfactory arrangement is for the machine to advance three-quarters of an inch at each complete rotation of the saws but other arrangements can be made if desired.

The saw 69 comprises a body plate 103 having a flange 104 at one edge, the flange forming with the edge of the plate a circular recess in which are seated cutting blades 105 held in position by a ring plate 106 clamped to the flange 104 by bolts 107. The base portion 108 of the blade 105 has in its front edge a rectangular notch 109 and on its rear edge a rectangular projection 110, both notch and projection having the same outline. When the blades are assembled in the saw the projection 110 of each blade enters the notch 109 of the adjacent blades so that the blades cannot slip out radially. Through certain of the blade holes 111 are provided through which the bolts 107 holding the ring 106 to the flange 104 pass. By reason of this construction a broken blade can be quickly and easily removed and a new one substituted.

The cutting portion of each blade is of irregular contour. The cutting edge 112 is much wider than the rear edge 113 and the outer face is curved as at 114, the rear edge being near the flange 104 while the cutting edge projects some distance from the flange. The front and side faces of the cutting portion are curved and cut under so that the edges 112 stand free and the tips 115 of the edge are equidistant from the center plane of the saw.

In place of the notches 109 and the projections 110 the base portion of each blade may have semi-circular notches which when the blades are assembled form circular holes 116 through which dowels 117 on the flange 104 project to prevent radial slipping of the blades.

As described above and as shown in Figs. 1 to 5 inclusive the frames 68 for the saws are at an angle to the machine so that the tips 115 of the blades strike the pavement first, thus facilitating the cutting of a hard surface. This arrangement is also of great advantage when the machine is used to cut worn pieces of asphalt from a pavement. The cut resulting is a groove with beveled edges and the edge of the good pavement can be joined to the asphalt patch without any further trimming or straightening. Moreover the cut is clean and there is no tendency for the good pavement to stick to the cutter and be raised and broken by it as is the case when a chopper is used. Also the material is actually removed along the line of the cut so that the cut can not be sealed by traffic before the worn portion is removed.

Conditions, however, sometimes arise in which it is of advantage to mount the frames 68 parallel to the machine so that the full edge 112 strikes the surface. The construction shown in Fig. 8 is then used. Comparing this with the construction shown in Fig. 3 it will be noted that the shafts 51, 52, and 53 are shorter and that certain changes are made in the supporting and positioning elements but no essential changes are made in the driving or operating mechanism.

At the rear of the machine supported by brackets 118 from the cross bar 12 is a platform 119 on which the operator stands. It will be noted that the levers and handles referred to above by which the operation of the various parts of the machine is controlled are all located at the rear so as to be in easy reach of the operator and so that the entire mechanism is operable by one man.

In general use only one cutter will be operated at a time but obviously both cutters can by the mechanism described above be brought into operation simultaneously.

It will be noted that while the wheels 42 are referred to as driving wheels only one of them is shown as fixed to the shaft 41. Referring to Figs. 2 and 8 the right wheel is pinned to the shaft while the left wheel is held in place by collars 120 pinned to the shaft. By this construction the machine can be quickly and easily turned without the use of a differential or compensating device.

While certain embodiments of this invention have been shown and described applicant is not to be limited thereby since it is obvious that others may be made without departing from the spirit and scope of the invention as set forth in the following claims.

Having thus set forth my invention that which I claim as new and for which I desire to obtain the protection of Letters Patent is the following:

1. In a machine for cutting asphalt pavements, traction elements for propelling the machine over said pavements, inclined cutters operating upon the pavement, separate frames for said cutters pivotally mounted on said machine laterally beyond said traction elements, means for raising said frames independently, a prime mover mounted upon said machine, a drive shaft rotated by said prime mover in a predetermined direction and gearing connecting said drive shaft with said traction elements and said cutters.

2. In a machine for cutting asphalt pavements, traction elements for propelling the machine over said pavement, inclined cutters operating upon the pavement, separate frames for said cutters pivotally mounted on said machine laterally beyond said traction elements, means for raising said frames independently, a prime mover mounted upon said machine, a drive shaft rotated by said prime mover in a predetermined direction, gearing connecting said shaft to said traction elements including means for controlling the direction of movement of the machine, and gearing connecting said shaft to said cutters.

3. In a machine for cutting asphalt pavements, traction elements for propelling the machine over said pavement, inclined cutters operating upon the pavement, separate frames for said cutters pivotally mounted on said machine laterally beyond said traction elements, a prime mover mounted upon said machine, a drive shaft rotated by said prime mover in a predetermined direction, gearing connecting said shaft to said traction elements including means for controlling the direction of movement of the machine, gearing connecting said shaft to said cutters, and independent mechanism for raising and lowering said cutters.

4. In a machine for cutting asphalt pavements, wheels for propelling the machine over said pavement, circular inclined cutters located outside said wheels for operating upon the pavement, separate frames for said cutters pivotally mounted on said machine, means for raising and lowering said frames independently, a prime mover mounted upon said machine, a drive shaft rotated by said prime mover, gearing connecting said shaft with said wheels and said cutters and levers for controlling the actuation of said wheels, the direction of the movement of the machine, and the operation of said cutters.

5. In a machine for cutting asphalt pavements, wheels for propelling the machine over said pavement, circular cutters located outside said wheels for operating upon the pavement, separate frames for said cutters pivotally mounted on said machine, a prime mover mounted upon said machine, a drive shaft rotated by said prime mover, gearing connecting said shaft with said wheels and said cutters and levers for controlling the actuation of said wheels, the direction of movement of the machine, and the operation of said cutters and for raising or lowering said cutter frames independently.

6. In a machine for cutting asphalt pavements, wheels for propelling the machine over said pavement located at one end of the machine, circular cutters outside said wheels for operating upon the pavement, separate frames for said cutters pivotally mounted on said machine, a prime mover mounted upon the machine adjacent the opposite end, a platform at said end upon which the operator stands, gearing connecting said prime mover with said wheels and cutters and levers at the platform end of the machine for raising or lowering said cutter frames independently.

In testimony whereof, I affix my signature.

WILLIAM J. HACKETT.